(12) United States Patent
Keller et al.

(10) Patent No.: US 9,086,556 B2
(45) Date of Patent: Jul. 21, 2015

(54) FIBER OPTIC CABLE WITH IMPROVED FLEXIBILITY, LOW TEMPERATURE AND COMPRESSION RESISTANCE

(71) Applicant: NEXANS, Paris (FR)

(72) Inventors: David Keller, Cary, NC (US); Randie Yoder, Garner, NC (US); Paul Kroushl, Lancaster, PA (US); Dan Rouse, Apex, NC (US)

(73) Assignee: NEXANS, Paris (FR)

( * ) Notice: Subject to any disclaimer, the term of this patent is extended or adjusted under 35 U.S.C. 154(b) by 255 days.

(21) Appl. No.: 13/764,982

(22) Filed: Feb. 12, 2013

(65) Prior Publication Data

US 2014/0226940 A1    Aug. 14, 2014

(51) Int. Cl.
*G02B 6/44* (2006.01)

(52) U.S. Cl.
CPC ............ *G02B 6/4429* (2013.01); *G02B 6/4434* (2013.01)

(58) Field of Classification Search
None
See application file for complete search history.

(56) References Cited

U.S. PATENT DOCUMENTS

| | | | | |
|---|---|---|---|---|
| 5,703,984 | A * | 12/1997 | Carratt et al. | 385/106 |
| 6,236,789 | B1 * | 5/2001 | Fitz | 385/101 |
| 6,249,629 | B1 * | 6/2001 | Bringuier | 385/113 |
| 6,621,965 | B2 * | 9/2003 | Seddon et al. | 385/111 |
| 6,798,958 | B2 * | 9/2004 | Bourget et al. | 385/113 |
| 6,973,246 | B2 * | 12/2005 | Bocanegra et al. | 385/113 |
| 6,982,965 | B2 * | 1/2006 | Itahara et al. | 370/317 |
| 7,054,531 | B2 * | 5/2006 | Hurley et al. | 385/106 |
| 7,382,955 | B1 * | 6/2008 | Keller | 385/109 |
| 7,397,992 | B1 * | 7/2008 | Blazer et al. | 385/106 |
| 8,620,124 | B1 * | 12/2013 | Blazer et al. | 385/102 |
| 8,886,000 | B2 * | 11/2014 | Register et al. | 385/101 |
| 8,909,012 | B2 * | 12/2014 | Register et al. | 385/101 |
| 8,913,862 | B1 * | 12/2014 | Emmerich et al. | 385/103 |
| 2003/0035635 | A1 * | 2/2003 | Chastain et al. | 385/112 |
| 2004/0120665 | A1 | 6/2004 | Hurley et al. | |
| 2005/0094953 | A1 * | 5/2005 | Park et al. | 385/103 |
| 2006/0153510 | A1 * | 7/2006 | Kim et al. | 385/113 |
| 2006/0198585 | A1 | 9/2006 | Keller et al. | |
| 2011/0188819 | A1 * | 8/2011 | Keller et al. | 385/103 |
| 2012/0134634 | A1 * | 5/2012 | Keller et al. | 385/113 |
| 2014/0112630 | A1 * | 4/2014 | Hennink et al. | 385/113 |

FOREIGN PATENT DOCUMENTS

WO    2004077120    9/2004

* cited by examiner

*Primary Examiner* — Tina Wong
(74) *Attorney, Agent, or Firm* — Sofer & Haroun, LLP

(57) ABSTRACT

A multi-tube optical fiber cable has a core with a first set of one or more optical fiber tubes, each having one or more optical fibers loosely arranged therein. The first set of tubes is constructed of a polymer having a low Young's constant modulus. The core also includes at least two strength members with a first binder arranged around the first set of optical fiber tubes and the strength members, where the first binder is substantially flat in shape such that there is no deformation of the first set of tubes, and where the strength members are offset from a central axis of the cable. The cable maintains a second set of a plurality of optical fiber tubes, each having one or more optical fibers loosely arranged therein, arranged around the outer circumference of the core.

14 Claims, 9 Drawing Sheets

FIBER OPTIC CABLE WITH IMPROVED FLEXIBILITY, LOW TEMPERATURE AND COMPRESSION RESISTANCE

RELATED APPLICATION

This application is related to co-pending U.S. patent application Ser. No. 12/858,153, filed on Aug. 17, 2010.

BACKGROUND

1. Field of the Invention

This application relates to communication cables. More particularly, this application relates to loose-tube type fiber optic cables.

2. Description of the Related Art

In the area of fiber optic cables, there are many different design features, each of which has some purpose, including fiber count, mechanical properties, environmental resistance properties, fire resistance/smoke, etc..... Among the various fiber optic cable designs, mid count-designs (e.g. more than 12—less than 200 fibers) typically contain the fibers in a loose tube style arrangement. "Loose tube" is a commonly understood term designating a fiber cable design that has a jacket, at least one buffer tube inside the jacket, with at least one (usually more) UV coated optical fiber(s) loosely contained inside each buffer tube.

More particularly, the "loose" term in "loose tube" refers to the fibers being loose within buffer tube thus allowing the fibers to reside within a relatively free space. Within this free space the fibers have the ability to bend/move (such as into a sinusoidal shape or minimally helical shape) along the length of the cable, accumulating as the cable (jacket and tubes) contracts over cold temperature extremes. By allowing for this "loose" room with the buffer tubes, the fibers are able to avoid the stresses imparted by cold temperatures on the tubes and jacket, and, as such, also avoids undue attenuation.

FIGS. 1 and 2 show typical prior art mid-sized loose tube fiber optic cables for forty eight (48) fibers (FIG. 1) and seventy two (72) fibers (FIG. 2). In these figures, a jacket is provided with either four or six buffer tubes each having twelve (12) loose fibers therein. Each of the tubes are arranged around a central strength member. This arrangement with the centrally located strength member, typically a GRP (Glass Reinforced Polymer), provides various mechanical advantages to the cable Including longitudinal strength, and cold temperature contraction resistance, cable resistance, etc.... In the examples shown in FIGS. 1 and 2, a few (e.g. three) aramid strength strands are added to the interior of the tubes) to aid with the strength of connectors added to the fibers at the ends of tubes (i.e. once they are removed from the cable for connectorization).

FIGS. 3-5 show other types of prior art loose tube fiber optic cables, having ninety six (96) fibers (FIG. 3); one hundred and thirty two (132) fibers (FIG. 4); and one hundred and forty four (144) fibers (FIG. 5), respectively. In these figures, a jacket is provided with eight, eleven or twelve tubes, each tube having twelve (12) loose fibers therein. As with FIGS. 1 and 2, each of the tubes are arranged around a central strength member, but in this case the strength member is an up-jacketed (i.e. polymer coated) GRP (Glass Reinforced Polymer) to provide various mechanical advantages to the cable including longitudinal strength, and cold temperature contraction resistance, cable resistance, etc..... An up-jacketed CSM (Central Strength Member) is usually constructed as GRP (Glass Reinforced Polymer) that may be encased within an extruded polymer jacket. As with the prior art arrangements in FIGS. 1 and 2, these examples in FIGS. 3-5, a few (e.g. three) aramid strength strands may also be added to the interior of the tube(s) to aid with the process of adding connectors to the fibers at the ends of tubes, when they are disassembled from the cable for connectorization.

Although these designs are adequate for many purposes, they have certain strength and mechanical property drawbacks, particularly with cold temperature resistance.

For example, as noted above, a normal design characteristic for a fiber optic cable is a cold temperature resistance rating. Cold temperatures cause the polymers in the jacket and buffer tubes to constrict, changing the spatial dimensions and relationships between the fibers and the polymer surrounding them. As explained in more detail below, under very cold temperatures, this constriction of polymer components eventually presses against the fibers, causing contact and excessive bending of the fibers leading to signal attenuation. A cold temperature resistance rating is the ability of a cable to withstand a certain low temperature without exceeding a certain threshold of attenuation. For example, in many designs for mid-count fiber optic cables, there is a maximum allowable attenuation of 0.3 db change under low temperature conditions (typically either 0° C., −20° C. or −40° C.).

The prior art designs of FIGS. 3-5 which have an upjacketed CSM (polymer covered central strength member) intrinsically have certain design limitations with respect to the cold temperature rating. For example, the upjacketed CSM, where upjacket encasement is extruded polymer on the CSM, has an increased cold temperature shrinkage due to the large size and the added plastic area. In other words, cold temperature shrinkage parameters for a cable is based in part on the type and total cross sectional area of the polymer in a cable, and an upjacketed CSM has additional cross sectional area of polymer, and thus increased shrinkage issues.

Another related problem to the general problem of shrinkage of the polymer components in cold temperatures is the problem of excess length between the fibers and polymer components caused by such shrinkage. For example, in addition to the cold temperature shrinkage of upjacketing on the CSM (Central Strength Member), the other polymers of the cable, such as the jacket and buffer tubes, also experience significant cold temperature shrinkage. In the prior art, the polymers used for such components, (jacket and the buffer tubes) may include PE (polyethylene), PVC/FRPVC (polyvinylchloride/flame retardant polyvinylchloride), FEP (Fluorinated Ethylene Polymer), PVDF (Polyvinylidene Fluoride) etc. . . . , each of which can shrink/contract a good amount, eg. between 0.2% to 1.5% shrinkage/contraction through the transition from room temp (23° C.) to cold temperatures (to −40° C.). The UV coated glass fibers, loosely contained in the buffer tubes, also contract in the cold, but to a much lesser extent, e.g. approximately 0.08%-1%. Moreover, the Aramid in the outer layer actually undergoes a moderate expansion in cold temperatures. The GRP of the CSM, a composite of glass and plastic, only contracts a slight amount, e.g. approximately 0.04%. The Glass Reinforced Polymers (GRPs), being bound with the plastic upjacket and tubes, slows and restricts the plastic contraction (of the upjacket and tubes), and conversely the plastic of the tubes and upjacket amplifies the GRP's contraction by a balance of forces.

The contraction in cold temperatures of these various polymer items ultimately results in the fibers having excess length relative to the tubes they are contained within. As noted above, the fibers may assume an exacerbated sinusoidal shape and even possible sharp angled bends when the available interior space within the buffer tubes is consumed by the contraction. Thus, as the temperature continues to go down, the attenuation in the fibers goes up resulting in the cable eventually failing or exceeding its desired threshold. In certain prior art designs, this situation can be further exacerbated when aramid yarns (strength elements) are used since that further limits the available free space in the buffer tubes leaving less room for adjustment.

OBJECTS AND SUMMARY

It is recognized that such large up-jacked/polymer coated CSMs (Central Strength Members), although useful at providing strength characteristics to the cable, are not particularly flexible, preventing cables from obtaining small bend radius ratings, they are large, leading to larger (unwanted) outer cable diameters, and they provide a significant fuel source during a fire, making it difficult for such cables to pass certain fire and smoke ratings.

The present arrangement solves such drawbacks and provides a new construction for mid and high fiber count optical fiber cable cores that does not use polymer jacketed CSMs, but instead utilizes two or more off-center and smaller non-polymer jacketed GRPs (Glass Reinforced Polymer), coupled with a novel arrangement and construction of the buffer tubes in the cable. The novel arrangement provides adequate cable strength and shrinkage resistance, in addition to improved flexibility and crush resistance.

In this configuration, a combination of substantially round buffer tube(s) include small GRPs (Glass Reinforced Polymers) interspersed into the interstices formed in the open spaces around the tubes. The small GRP (Glass Reinforced Polymers) strength members in such interstices are off-center from the center axis of the cable. This configuration renders a cable core and a central strength unit that acts as the cable's anti-contraction and strength unit around which additional buffer tubes may be stranded. Strength yarns may be added after the jacket is applied, rendering a cable with a higher density/space utilization of the buffer tubes. This arrangement additionally provides increased flexibility over prior art designs by avoiding the use of prior art large diameter GRPs (Glass Reinforced Polymers) in the core such as those shown in FIGS. 1-5. This arrangement also additionally improves compression resistance features of the optical fiber cable by filling the voids between the buffer tubes for GRP placement, thus buttressing the buffer tubes against environmental compression forces.

The present arrangement also provides a loose tube fiber optic cable design for mid-count fiber optic cables that is capable of significantly improved cold temperature resistance, such as maximum attenuation of +0.3 db when the temperature decreases from 23° C. to −60° C. In this context, the present arrangement utilizes polymers that exhibit a shrinkage of about 0.17% for cables having a PVDF jacket and 0.08% for the cable with a FRPVC jacket, with such characteristics being sustained even with the addition of buffer tubes around the core for higher (medium) count fiber optic cables.

Moreover, the present arrangement has additional advantages regarding other mechanical characteristics including improved crush resistance and moisture resistance.

It is another object of the present arrangement to provide improved processing for pre-connectorization of such medium fiber count cables. In the prior art, owing to the inflexibility of the cores, such as those shown in prior art FIGS. 3-5, the connector adding process was typically carried out on larger 20" drums. The present arrangement can be done on smaller 10" drums making such processing easier and resulting in a stored coil of a much smaller diameter than usual.

For example, prior art cables having the typically large center upjacketed GRPs are employed more frequently in server farm applications where pre-connectorized cables are often requested. For ease of handling and storage and shipment the connectorization process often coils the cables to radius' which are less than the manufactured recommended radius. For example, the recommended radius for long terms storage is a radius of 15-20× the cable diameter, where the cable is typically shipped and stored on reels which have drums that render a wrapped and supported radius of 15-20× the cable diameter.

However, the increased use of unsupported coils and the use of smaller stored coils (having radii of about 5-10× the cable diameter) have rendered some prior art cables/coils very difficult to handle, and in some cases the prior art GRPs themselves fail under the bend stress over time.

For example, in one arrangement, typical fiber optic cables may be shipped on reels with drums having diameters of 14" to 24". The cable supports the surrounding layers having an overall cable length of about 3000+ feet. Additionally, with the newer practice of pre-connectorization, fairly short lengths (e.g. 100+ feet) of cables is coiled in as small of coil as possible and spooled by machine or by hand, often as small as a 6" to 10" diameter. In these situations the stress of the smaller diameter is exacerbated by pulling the coiled cable off of this small reel by hand thereby placing twists in the cable adding even more stress to the GRPs in the cables. In the prior art cables, multiple GRPSs have fractured under these conditions. Thus, these pre-terminated cables represent a new environment of storage and shipping standards that is not conducive to the use of existing cable designs.

The arrangement of the present cable, as described in more detail below, addresses this issue and provides a cable construction that may be coiled and spooled in a traditional manner as well as in the newer pre-terminated manner on tighter coils without damage to the cable strength/support structure.

To this end, a multi-tube optical fiber cable has a core with a first set of one or more optical fiber tubes, each having one or more optical fibers loosely arranged therein. The first set of tubes is constructed of a polymer having a low Young's constant modulus. The core also includes at least two strength members with a first binder arranged around the first set of optical fiber tubes and the strength members, where the first binder is substantially flat in shape such that there is no deformation of the first set of tubes, and where the strength members are offset from a central axis of the cable.

The cable maintains a second set of a plurality of optical fiber tubes, each having one or more optical fibers loosely arranged therein, arranged around the outer circumference of the core.

BRIEF DESCRIPTION OF THE DRAWINGS

The present invention can be best understood through the following description and accompanying drawings, wherein.

DETAILED DESCRIPTION

Figure 6:
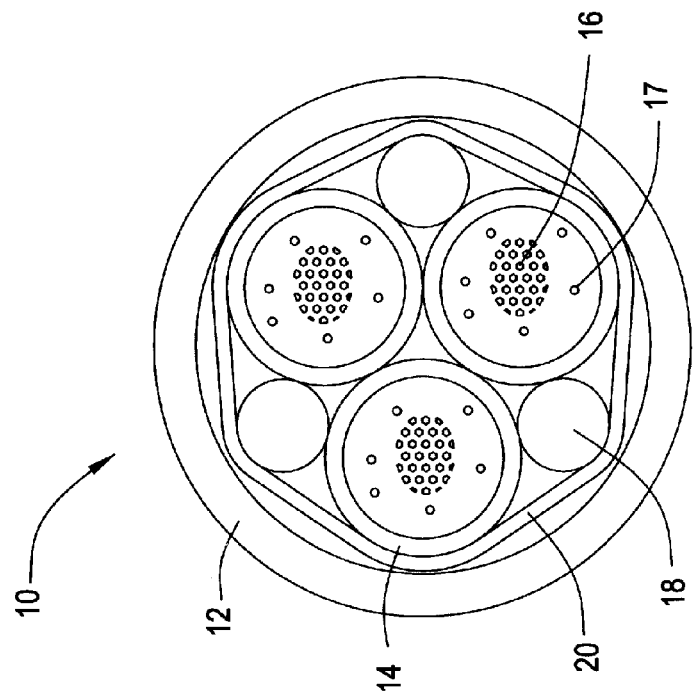
FIG. 6 is a cross section of a loose tube fiber optic cable core according to one embodiment.

In one embodiment of the present arrangement shown in FIG. 6, a fiber optic cable core 10 is shown having thirty six (36) fibers. Cable core 10 includes three (3) buffer tubes 14 that are preferably constructed of FRPVC (Flame Resistant Polyvinylchloride). It is noted that the invention is not limited in this respect and the features described herein for cable core 10 may be used in cable construction using other polymers for tubes 14 as desired. Applicant notes that core 10 is not a cable in and of itself but a central component of a cable. The full cable is described later in the application after the construction of core 10 is covered.

Also as shown in FIG. 6 each of tubes 14 in cable core 10 include twelve (12) fibers 16, such as typically UV coated optical fibers with a size of approximately 250 microns. It is noted that instead of UV coated optical fibers 16, they may be tight buffer type (900 micron) fibers, such as one or two per tube 14. However, for the purposes of illustrating the features of the present arrangement, fibers 16 are described throughout as basic UV coated glass optical fibers 16 in a loose tube arrangement.

In addition, FIG. 6 shows each tube having three (3) aramid strength members 17 within each tube 14. Aramids 17 are included in core 10 design known as ACP (Aramid Connect Plenum) meaning that aramids 17 help with providing connectorization strength. It is understood that the features of the present arrangement may alternatively be presented as an LTP (Loose Tube Plenum) cable core 10 without any aramids in tubes 14.

Regarding the assembly of the internal component of core cable 10, as shown in FIG. 6, each tube 14 is positioned in the center of core 10, with one GRP (Glass Reinforced Polymer) 18 per tube 14, each positioned around the periphery of the internal components of cable core 10. GRPs 18 are preferably made of glass, but may also be made from aramid. Thus, tubes 14 are positioned as close as possible to the center axis of the cable, with GRPs 18 positioned apart from the center axis.

As shown in FIG. 6, a binder 20 surrounds tubes 14 and GRPs 18 (Glass Reinforced Polymer). In one exemplary arrangement, binder 20 is preferably 0.25 inches wide approximately comprising a quantity of four (4) 1500 denier polyester water swellable binders assembled into one unit with an added water swellable coating thereon. Binder 20 has a nominal strength of 1.5 lbs (per 1% elongation) per each of the four strands, thus adding up to a combined strength of 6 lbs (per 1% elongation). It is understood that binder 20 is exemplary only and may be modified as necessary for the design.

According to one embodiment, the assembly of cable core 10 components, including (three (3) tubes 14, three (3) Glass Reinforced Polymers (GRPs) 18 and binder 20) is accomplished by having the GRPs 18 at a 20%-50% lower pay off tension than tubes 14 and using a 3-4 inch SZ lay length.

Binder 20 is then advantageously applied in a helical lay length of 0.8 inches over the SZ stranded GRPs 18 and tubes 14.

According to the above arrangement, a significant improvement is made regarding the ability of cable core 10 to withstand environmental cold temperature shrinkage, avoiding excessive signal attenuation in fibers 16 as described in more detail below.

Figure 7:
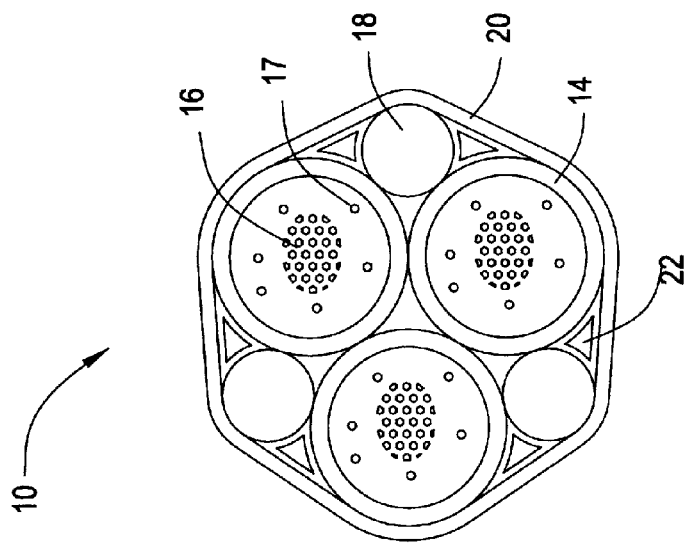
FIG. 7 is a cross section of a loose tube fiber optic cable core according to one embodiment.

In another embodiment as shown in FIG. 7, to add additional crush resistance, the interstices between tubes 14 and GRPs 18 are filled with a filler powder 22 to provide an improved ability to resist crushing.

According to this feature, filling the interstices with filler powder 22 between tubes 14 and GRPs 18 allows for a lower modulus polymer, such as the preferred FRPVC (Flame Resistant Poly Vinyl Chloride), to be used for jacket 12 while still meeting crush resistance requirements. This low modulus plastic (of FRPVC) is preferential because it has a lower cold temperature contraction response from 0.22% to 0.08% instead of to only 0.17%.

Turning to the application of filler 22, in one embodiment, upon assembly of internal components tubes 14, GRPs (Glass Reinforced Polymers) 18 and binder 20 assembly stranding and binding, prior to a jacket being applied to core 10, the assembled internal components may be fed through a powder application solution (mixture of powder and suspension/application liquid) to fill between 25% to 75% of the remaining voids between binder 20 and tubes 14.

In one example filler 22 may be a flame retardant compound such as Alumina Trihydrate, or magnesium hydroxide, or other hydrated mineral filler powder. Here the Alumina Trihydrate powder is mixed with water to form a paste that is then applied to the stranded tubes 14 and GRPs (Glass Reinforced Polymer) 18, which in turn is run through a dryer or hot air channel. Likewise, when using a standard WS (water swellable) powder, the powder may be applied wet and dried for later use as an actual water blocking agent. Additionally, one version may use the Alumina Trihydrate wet application and then, after drying a standard dry WS (Water Swellable) powder may be applied for use as an actual water blocking agent.

Regardless of the powder used for filler 22, as a result of the above feature, internal component tubes 14, GRPs 18 and binder 20 along with filler 22 filling the interstices present a substantially cylindrical arrangement within cable core 10 so that when compression is applied against a cable having such a core, there is a more uniform contact with the underlying components spreading the compression more evenly and thus reducing the likelihood that there is any signal attenuation in the fibers 16 within tubes 14.

Figure 4:
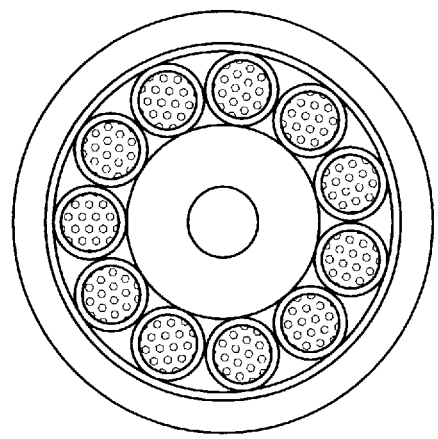

Moreover, filler 22 may have additional advantages beyond the crush resistant properties discussed above. For example, the use of Alumina Trihydrate as a filler, added to the interstices between tubes 14 and GRPs (Glass Reinforced Polymers) 18 advantageously adds significant fire resistant properties to cable core 10. For example, although Alumina Trihydrate which forms water upon combustion is known as one possible additive to use in PVC to form FRPVC, it has significant drawbacks regarding the degradation of the PVC as an insulator. However, in the present arrangement, by using it as a filler 22 outside of the polymer of tubes 14, but inside cable core 10, if filler 22 were to crack, it would not have the same impact as it would if the Aluminum Trihydrate filler were incorporated directly into tubes 14. As such, filler 22 may not only be used in the present described cable core 10 as shown in FIG. 4, but also in other loose tube and even tight buffer fiber optic cable designs for both crush resistance and additional fire resistance.

Figure 9:
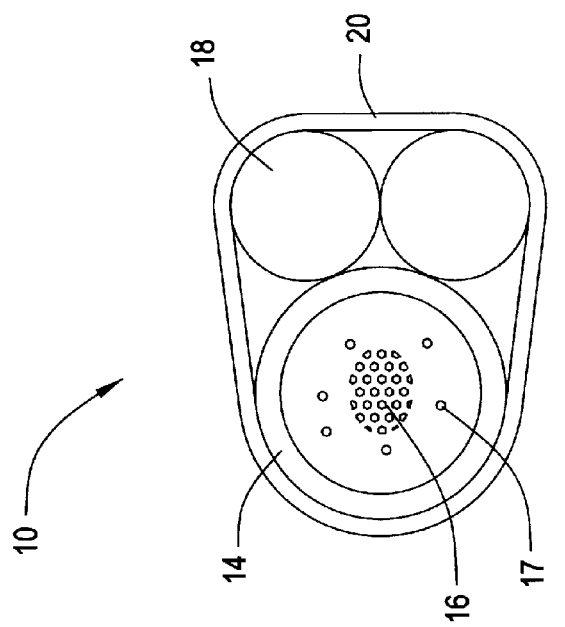
FIG. 9 is a cross section of a loose tube fiber optic cable core according to one embodiment.

Having described cable core 10 for a three (3) tube 14, three (3) GRP (Glass Reinforced Polymer) 18 core 10 as shown in FIGS. 6 and 7, it is noted that a smaller core may be generated in a similar manner, with similar component construction. For example, as shown in FIGS. 8 and 9 additional smaller versions of cable core 10 may employ the same features as described above for twenty four (24) fiber (FIG. 8) and twelve (12) fiber (FIG. 9) arrangements, with similar advantages provided with respect to shrinkage resistance at very cold temperatures (e.g. −60° C.) and crush resistance.

Figure 10:
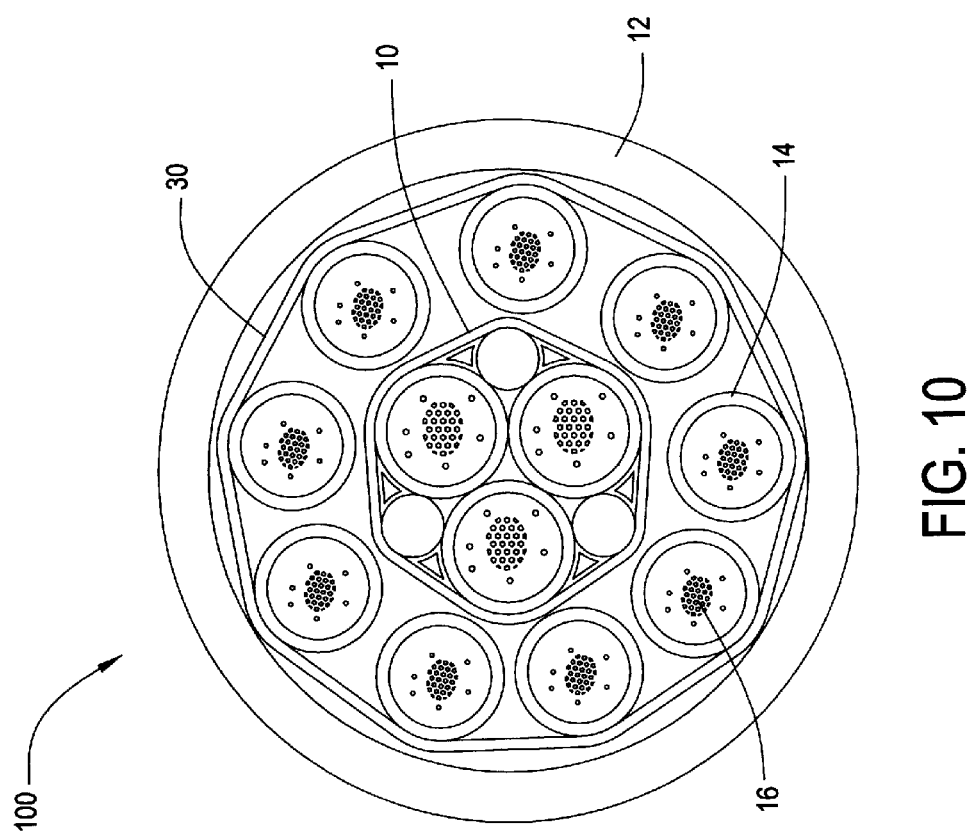
FIG. 10 is a cross section of a loose tube fiber optic cable according to one embodiment.

In another embodiment of the present arrangement as shown in FIG. 10, a core 10 is surrounded, on the outside of binder 20 by additional tubes 14, each of which including for example twelve fibers 16 forming cable 100. Tubes 14 on the outside of core 10 are essentially the same construction as those tubes 14 on the inside of core 10.

In one arrangement the outer tubes 14 are applied in an SZ stranded manner over core 10. Such an SZ stranding of outer tubes 14 provides for easier mid span access to fibers 16.

In another arrangement, the outer tubes 14 are applied in an uni-directional helical stranded manner over core 10. Such helical stranding would not be dependent on the use of binders for holding the tubes in their place during the cabling operation. Additionally, the arrangement where tubes 14 are helical wound around core 10 is preferably used for a cable that is subjected to more temperature and handling extremes over its life, and where mid span access is not expected. Also the helical stranding is a more pure capture of the strain window capability of the design and typically allows for an "additional" −10 to −20 C temperature change capability as compared to the SZ design. It is understood that both helical and SZ stranding of tubes 14 over core 10 are within the contemplation of the present invention.

Once additional tubes 14 are applied around core 10, a binder 30 may be applied over these outer tubes 14, similar to binder 20 used over the tube(s) 14 in core 10.

It is noted that for tubes 14, the selection of polymers is based on among other things a combination of cost, ease of use, crush resistance, environmental protection, installation flexibility, production quality in view of a better extrusion line speed, and fire safety concerns.

In the context of the present arrangement, one such factor that is addressed is the tensile strength of the polymer for tubes 14 used in core 10. The present arrangement contemplates selecting polymers for tubes 14 so as to accommodate the flexibility and cold temperature resistance as explained in more detail below.

Tensile strength is defined as a stress, which is measured as the force exerted per unit area. The tensile strength of a polymer is found by taking the max load divided by the minimum area (e.g. as per the testing standards TIA/EIA FOTP 89) representing the maximum stress that a material can withstand while being stretched or pulled before necking, i.e. when the specimen's cross-section starts to significantly contract. This is found by performing a tensile test and recording the stress versus strain, the highest point of the stress-strain curve is typically used as the tensile strength.

Figure 11:
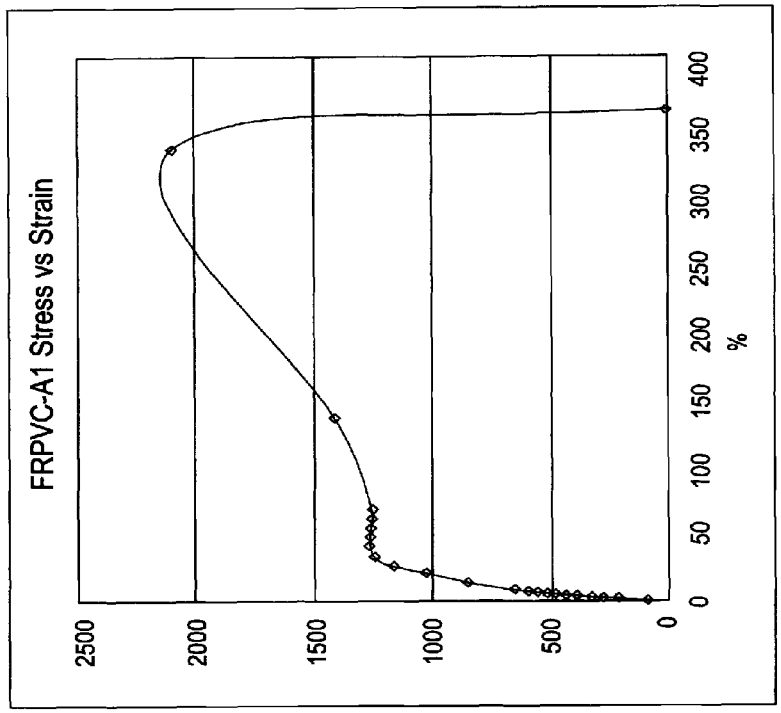
FIG. 11 is a stress vs. strain chart for FRPVC cable according to one embodiment.
Figure 12:
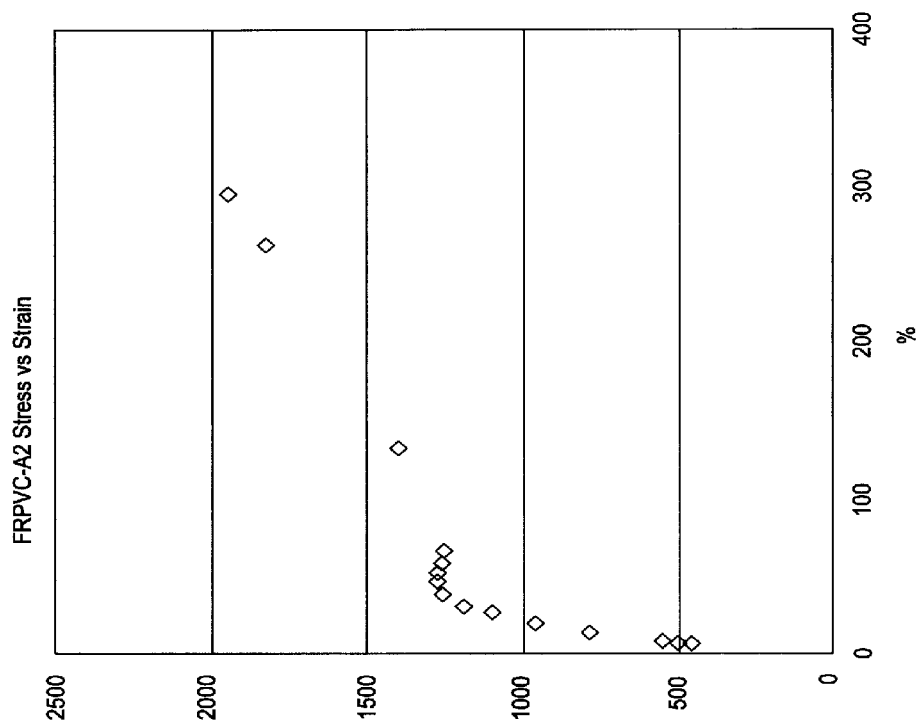
FIG. 12 is a stress vs. strain chart for FRPVC cable according to another embodiment.

FIG. 11 is a table showing an exemplary stress-strain curve of a first FRPVC (Flame Resistant Poly Vinyl Chloride) sample (A1) versus strain with FIG. 12 showing a second (A2) sample. In such tables, the Young's modulus, "E," can be calculated by dividing the tensile stress (force divided by area) by the tensile strain (incremental increase in length or delta-length divided by original length).

In accordance with one embodiment of the present arrangement, tubes 14, and made from low modulus FRPVCs that have a tensile strength range from about 2000-3000 psi, and a Young's tensile or compression modulus of 40-90 N/mm2 (5800 psi to 13050 psi). In another embodiment PVDF (Polyvinylidene fluoride) may be employed with a tensile strength of 2200 to 6200 psi and a Young's tensile or compression modulus of 200-400 N/mm2 (31900 psi to 58000 psi—with up to 160,000 psi is possible). In yet another embodiment, PP (Poly Propylene) may be employed having a tensile strength of 4000 to 6000 psi and a Young's tensile or compression modulus of 130 to 800N/mm2 (18850 psi to 116,000 psi). In yet another embodiment, MDPE may be employed having a tensile strength of 2200 to 4000 psi and a Young's tensile or compression modulus of 150 to 400 N/mm$^2$ (21750 psi to 58000 psi).

Typically, polymers having a higher tensile strength or Young's modulus perform better in the compression test. However, generally speaking, tensile strength test measures the strength at elongation of several factors over the normal range while the compressive strength in a compression test is the result of the tube being collapsed by the force between two parallel plates and the values can be quite different.

For example, compressive strength is the capacity of a material or structure to withstand axially directed pushing forces. By definition, the compressive strength of a material is that value of uni-axial compressive stress reached when the material fails completely. The compressive strength is usually obtained experimentally by means of a standard test. The apparatus used for this experiment is the same as that used in a tensile test. However, rather than applying a uni-axial tensile load, a uni-axial compressive load is applied. The cable is shortened as well as spread laterally. Even in a compression test, there is a linear region where the material follows the Young's Modulus for compression. This linear region terminates at what is known as the yield point. The stress is defined as the force divided by the area at the start of the experiment.

The standard test TIA/EIA FOTP 41 describes the cable compression test as the force applied between two 10 cm plates, where a force of 225 lb or 1000 N would render a force of 100N/cm or cable length. Typically cables or hollow tube 2.0 mm ID and 3.0 mm OD components constructed of PVDF, PP or PE can easily withstand the 100N/cm of compressive force. Where the Flexible FRPVC yield at 25-50 N/cm of tube or cable length where the designs are equal. To raise the compressive resistance of the hollow tube components to 100 N/cm novel assemblies of the tubes and novel space utilization is required to render a better support structure.

It has been found that when using high modulus plastics, the associated expansion and contraction during thermal cycling caused by exposure to hot and cold temperatures imparts too much stress on the underlying fibers 16 in tubes 14. Although binders, generally help by securing the tubes, such as tubes 14 to a central strength member, which in turn is less affected by the temperature changes to alleviate such an effect, such an arrangement has not proven effective to fully overcome the problem.

To this end, the present invention provides for an arrangement where tubes 14 are constructed of a polymer having a tensile strength range from 2000-3000 psi, and a Young's modulus of 40-90 N/mm2 or 5800 psi to 13050 psi.

The use of such low-modulus, preferably heavily filled flame retardant plastics, for tubes 14, such as those resulting in a tensile strength range from 2000-3000 psi, and a Young's (tensile or compression) modulus of 40-90 N/mm2 (5800 psi to 13050 psi) have been advantageously used in the present tubes 14 because they provide better results against shrinkback after extrusion as well as resisting shrinkage in response to cold temperature exposure. The starting modulus and lower tensile strength enables a lower rigidity at the lower glass transition point or temperature where the plastic is cold and brittle making tubes 14 less likely to crack at typical operating and handling temperatures. Lower forces exerted from temperature expansion and contraction over temperature, given the lower modulus of the materials, results in an expanded temperature operation window.

Returning to the structure of core 10 and the cables made using the same, binders 20 in the core and 30 around outer tubes 14 are arranged around the tubes 14 and are substantially flat in shape such that there is no deformation of tube 14, when the binders 20 and 30 are applied. For binder 30 and 20, the 6 mm width, four 1500 denier binders render anchoring of tubes 14 to the GRP(s) 18 in core 10, and afterwards anchor the outer layer of tubes 14 to core 10, which in turn renders a balancing or summation of the expansion and contraction tendencies of the total package, rendering a more strain free environment for fibers 16 within tubes 14. Such optimal binding of tubes 14 to GRP(s) 18 is done, even with the low Young's constant modulus polymer for tubes 14, without deforming or crushing tubes 14 as a result of the wide-flat shape of binders 30 and 20. Additionally it is these low modulus tubes which allow the small dispersed GRPs 18 to accomplish the amount of anti-buckling that is required, because the low modulus tubes 14 require less anti-buckling by their very nature.

In one embodiment, binder 30 is applied helically around core 10 or outer layer of tubes 14 in a first direction and again in a reverse direction resulting in a crossed arrangement. This is done using two traditional extrusion line binder heads, each working in opposite helical directions, in a step prior to extrusion of jacket 12 (described below). It is noted that two oppositely wound binder strands may be used for both binders 20 and 30, however, ideally, four are used as described herein.

As such, the resulting structure is formed such that binder 30 does not cut into tubes 14 because of its wide flat shape, even though the modulus of the polymer used in tubes 14 is low.

As noted above, the polymer used in tubes 14 have a tensile strength range from 2000-3000 psi, and a Young's modulus of 40-90 N/mm2 or 5800 psi to 13050 psi (such as a polymer of FRPVC (Fire Resistant Poly-Vinyl Chloride)). Binders 30 binder 20 are applied at a tension sufficient to reach a limit at which deformation of tubes 14 begins, without exceeding a tension to cause substantial deformation. Yet application tension of binder 30 couples outer tubes 14 to core 10 and core tubes 14 to GRPs 18.

Once additional tubes 14 are applied around core 10 and binder 30 is set, jacket 12 may be applied to form a complete multi-fiber optical fiber cable 100.

In one arrangement, jacket 12 for cable 100 is made from either PVDF (Polyvinylidene Fluoride) or FRPVC (Flame Resistant PolyVinyl Chloride). Regarding the polymer used for jacket 12, PVDF provides very good smoke and fire resistance properties and also provide good crush resistance properties and cold temperature brittleness resistance. However, PVDF is expensive and does tend to have a higher coefficient of linear expansion/contraction meaning that in cold temperatures the PVDF jacket may shrink significantly, even more so than the FRPVC tubes. As such, rather than using FRPVC only for tubes 14, it may also be used for jacket 12 as well. This FR (Flame Resistant) version of PVC provides adequate smoke and fire resistance properties for plenum and riser fire ratings for communication cables and even helps with the cold temperature shrinkage issue discussed in this application.

However, because the FRPVC requires a low young's modulus of approximately 1800-2800 it does not behave as a good crush resistance material. For example, typically, to make FRPVC the FR fillers are maximized and the plasticizers, that allow flexibility at low temperatures, are minimized due to their negative or excessive fuel contribution in the riser or plenum test. However, the FRPVC still needs a low temperature resistance (notch test) −20° C. to −40° C. to be able to relatively withstand to 0° C. to −20° C. cold temperature impact test and general impacts of low temperature installations. Typically, the modulus of PVC increases and becomes more brittle as the plastic become colder further complicating the cold temperature requirement. Thus, starting with a lower modulus PVC to make FRPVC provides a balance of the fire resistant fillers and minimal plasticizers resulting in the workable compromise. Thus, while having a low modulus PVC aids in passing cold impact, the ability to withstand external crush forces is often reduced to an unacceptable level, which is addressed in more detail below.

Figure 13:
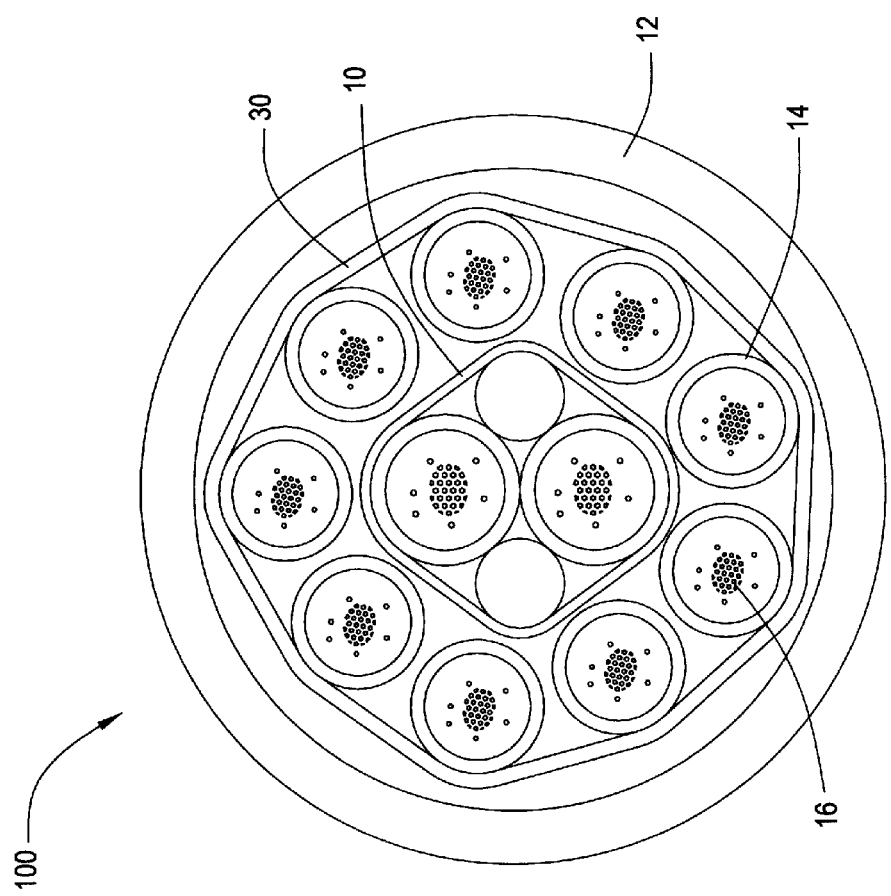
FIG. 13 is a cross section of a loose tube fiber optic cable according to one embodiment.
Figure 14:
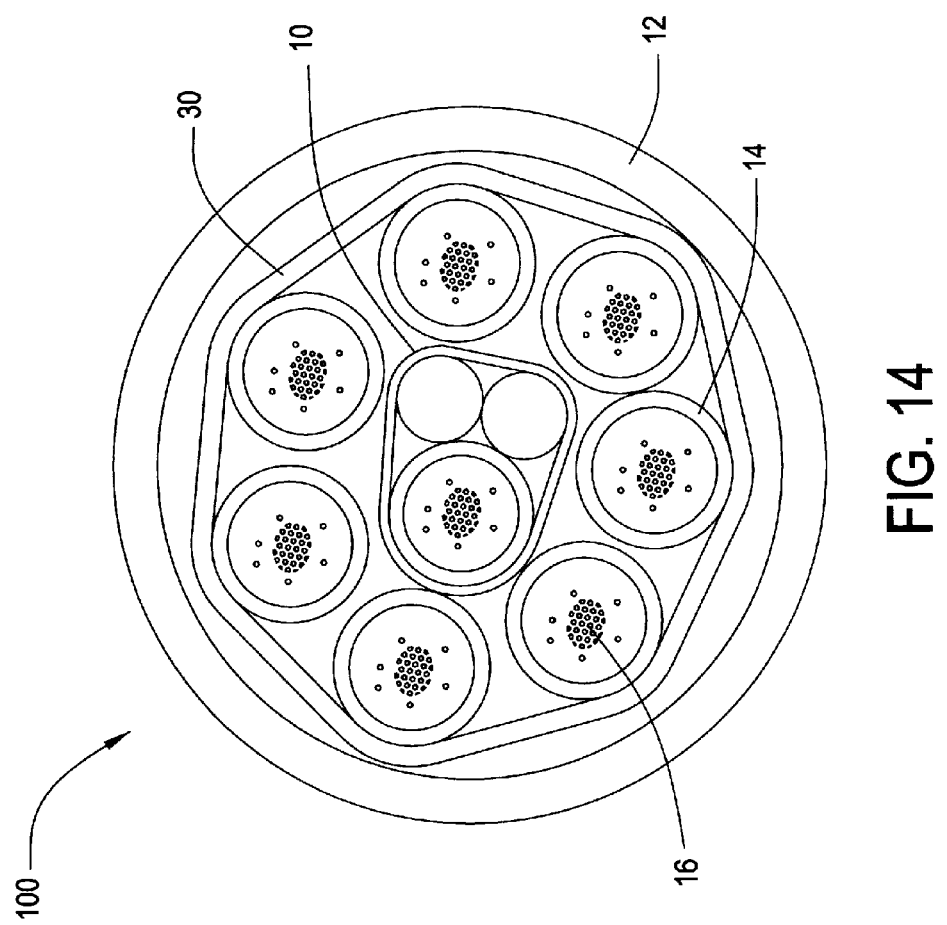
FIG. 14 is a cross section of a loose tube fiber optic cable according to one embodiment.

In another embodiment of the present arrangement, as shown in FIGS. 13 and 14 different arrangements for ninety six and one hundred and thirty two fibers 16 are shown. In FIG. 13, core 10 has two GRPs 18 and two tubes 14 with a first binder 20 with nine additional tubes 14 around core 10 having another binder 30 around those tubes. This renders eleven (11) tubes 14 in all for a total of one hundred and thirty two (132) fibers 16 (twelve fibers 16 per tube 14).

In FIG. 14, core 10 has two GRPs 18 and one tube 14 with a first binder 20 with seven additional tubes 14 around core 10 having another binder 30 around those tubes. This renders eight (8) tubes 14 in all, for a total of ninety six fibers (96) 16 (i.e. twelve fibers 16 per tube 14).

It is understood that the elements of cable 100 described above in reference to FIG. 10 are equally applicable to the arrangements of cable 100 shown in FIGS. 13 and 14 as well.

Turning now to the advantages of the above structure regarding bending, size, and compression resistance across a wide variety of temperatures, generally, the cold temperature contraction between two materials is substantially balanced by the SUM of the A*E*∂/A*E of the two materials where A=area, E=modulus and "∂"=coefficient of contraction. For example, in an exemplary case, a buffer tube having material 1 and a GRP having material 2 where the A, E and ∂ are different for each materials 1 and 2, the combined elements stranded together render an effective "∂" (of the unit) where:

$$\frac{\Sigma(A1 \times E1 \times \partial 1) + (A2 \times E2 \times \partial 2)}{\Sigma(A1 \times E1) + (A2 \times E2)}$$

to render the effective ∂ or coefficient of expansion or contraction for the assembly. As the modulus of the plastic material 1 in the example is decreased, the need for the offsetting modulus of the GRP is decreased to a point. However, in the case of the four buffer tubes around one GRP as in the prior art FIG. 1, the area of the center GRP is small relative to the area of the plastic of tubes and jacket comparatively. Additionally, due to the geometrical layout of the four (4) tubes around one GRP in the prior art FIG. 1, there is minimal available space in the perimeter voids (between the tubes and the inside of the jacket) for placement of substantial/additional GRPs.

Figure 1:
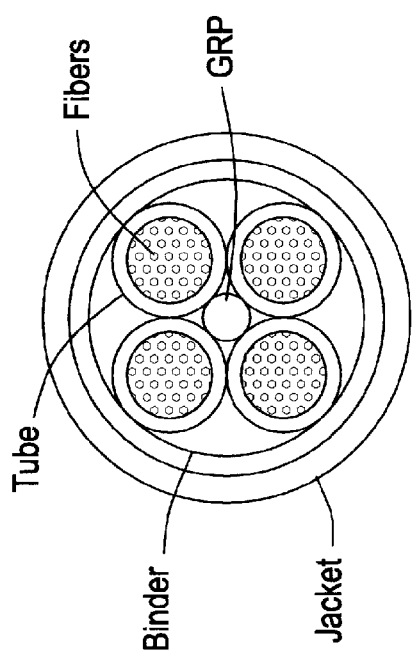

As result, a single GRP is not able to fully compensate for the shrinkage in cold temperatures and thus the overall design of the prior art FIG. 1, reaches the edge of the limit for attenuation resistance. In other words, the use of four tubes around one GRP results in an overall combined coefficient of contraction that is only barely sufficient to prevent shrinkage (e.g. at 0° C.) to the point where the fibers in the tubes will bend into exaggerated sinusoidal waves. This situation is even further deteriorated when aramids are added inside the tubes, further reducing the amount of free space in the tubes.

The present arrangements as shown in FIGS. 10 and 13-14 do not have this problem. As noted above, the effective coefficient of expansion a of an assembly of cable components is a function of the $\Sigma AE\partial(1-i)/\Sigma AE(1-i)$ of each material. Thus, according to the present arrangement the area of GRPs 18 is increased relative to the area of tubes 14 as well as the jacket, discussed below, offsetting the area of the plastic.

Moreover, the FRPVC (Flame Resistant PolyVinyl Chloride) used for tubes 14 is filled with additional flame retardant fillers which also act to reduce the contraction of the plastic to some extent. In addition to these two factors, because the GRPs 18 and tubes 14 are arranged on a one-by-one basis in a stranded and bound arrangement, the geometry of this assembly works to couple the lesser contracting GRPs 18 to the tubes 14, again increasing the cold temperature resistance of the assembly.

Turning now to some exemplary results, the following described tables 1-16 show results for contraction percentages for cores 10 and cable 100 described above.

The first set of tables 1-7 show exemplary sizes and test results for core 10 and prior art versions of comparable arrangements.

Figure 2:
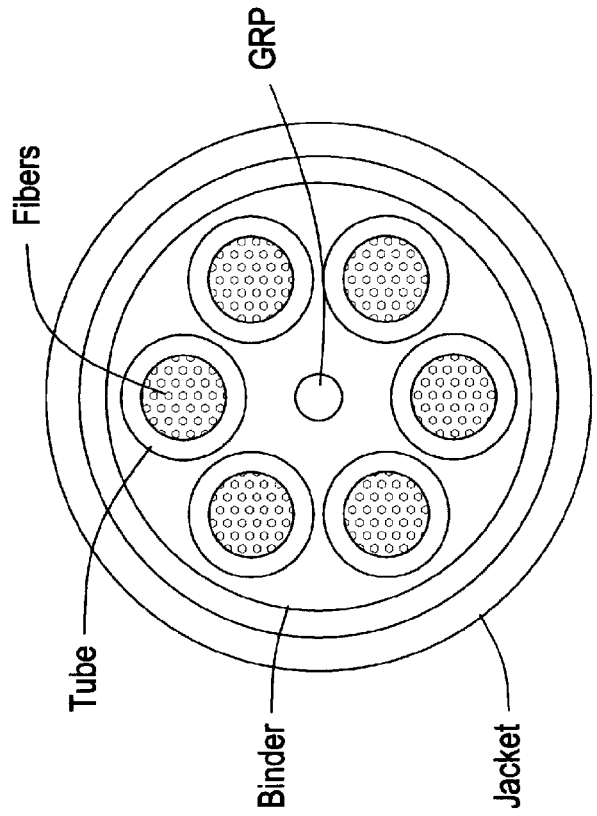
FIGS. 1-5 are prior art loose tube fiber optic cables.

Table 1 shows an exemplary set of measurements for a construction according to prior art FIG. 2 using a PVDF jacket with FRPVC tubes.

TABLE 1

| Prior Art 6 @1 PVDF Jkt | ID (mm) | OD (mm) | Qty | Area | E (N/mm$^2$) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 6 | 23.6 | 90 | 7E−05 | 2121 | 0.15 | | | | | |
| GRP | 0 | 3.2 | 1 | 8.0 | 50000 | 6E−06 | 402124 | 2.39 | | | | | |
| Jacket PVDF | 9 | 11.3 | 1 | 36.7 | 400 | 1E−04 | 14668 | 1.91 | | | | | |
| Plastic To GRP Ratio | | | | 7.5 | | | | | 418912.53 | 4.45 | 1.1E−05 | 83 | 0.09% |
| GRP flexible Bend Diameter (mm) = 100 × GRP Diameter | | 320 | | | | | | | | | | | |
| Typical Bend Cable Diameter is 20 X Cable OD | | 226 | | | | | | | | | | | |

Table 2 shows an exemplary set of measurements for a construction according to prior art FIG. 2 using an FRPVC jacket with FRPVC tubes.

TABLE 2

| Prior Art 6 @1 FRPVC Jkt | ID (mm) | OD (mm) | Qty | Area | E (N/mm$^2$) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 6 | 23.6 | 90 | 7E−05 | 2121 | 0.15 | | | | | |
| GRP | 0 | 2.28 | 1 | 4.1 | 50000 | 6E−06 | 204141 | 1.21 | | | | | |
| Upjacket for grp | 2.28 | 3.2 | 1 | 4.0 | 90 | 7E−05 | 356 | 0.03 | | | | | |
| Jacket PVDF | 9 | 11.3 | 1 | 36.7 | 400 | 1E−04 | 14668 | 1.91 | | | | | |
| Plastic To GRP Ratio | | | | 14.8 | | | | | 221285.73 | 3.30 | 1.5E−05 | 83 | 0.12% |
| GRP flexible Bend Diameter mm) = 100 × GRP Diameter | | 228 | | | | | | | | | | | |
| Typical Bend Cable Diameter is 20 X Cable OD | | 226 | | | | | | | | | | | |

Table 3 shows an exemplary set of measurements for a construction according to prior art FIG. 1 using a PVDF jacket with FRPVC tubes.

TABLE 3

| Prior Art 4 @1 PVDF Jkt | ID (mm) | OD (mm) | Qty | Area | E (N/m | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 4 | 15.7 | 90 | 7E−05 | 1414 | 0.1 | | | | | |
| GRP | 0 | 1.3 | 1 | 1.3 | 50000 | 6E−06 | 66366 | 0.39 | | | | | |
| Jacket PVDF | 7.25 | 9.55 | 1 | 30.3 | 400 | 1E−04 | 12132 | 1.58 | | | | | |
| Plastic To GRP Ratio | | | | 34.7 | | | | | 79911.75 | 2.07 | 2.6E−05 | 83 | 0.22% |

TABLE 3-continued

| Prior Art 4 @1 PVDF Jkt | ID (mm) | OD (mm) | Qty | Area | E (N/m) | a | AE | AEa | SUM AE | SUM Aea | a eff | Temp 23 to −60 | % contraction |
|---|---|---|---|---|---|---|---|---|---|---|---|---|---|
| GRP flexible Bend Diameter (mm) = 100 × GRP Diameter | | 130 | | | | | | | | | | | |
| Typical Bend Cable Diameter is 20 X Cable OD | | 191 | | | | | | | | | | | |

Table 4 shows an exemplary set of measurements for a construction according to the present core 10 arrangement shown in FIG. 6 using a PVDF jacket with FRPVC tubes.

TABLE 4

| 3 tube 3 grp PVDF jacket | ID (mm) | OD (mm) | Qty | Area | E (N/mm$^2$) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 3 | 11.8 | 90 | 7E−05 | 1060 | 0.08 | | | | | |
| GRP | 0 | 1.3 | 3 | 4.0 | 50000 | 6E−06 | 199098 | 1.18 | | | | | |
| Jacket PVDF | 6.45 | 8.75 | 1 | 27.5 | 400 | 1E−04 | 10983 | 1.43 | | | | | |
| Plastic To GRP Ratio | | | | 9.9 | | | | | 211141.73 | 2.69 | 1.3E−05 | 83 | 0.11% |
| GRP flexible Bend Diameter (mm) = 100 × GRP Diameter | | 130 | | | | | | | | | | | |
| Typical Bend Cable Diameter is 20 X Cable OD | | 175 | | | | | | | | | | | |

Table 5 shows an exemplary set of measurements for a construction according to the present core 10 arrangement shown in FIG. 6 using an FRPVC jacket with FRPVC tubes.

TABLE 5

| 3 tube 3 grp FRPVC jacket | ID (mm) | OD (mm) | Qty | Area | E (N/mm$^2$) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 3 | 11.8 | 90 | 7E−05 | 1060 | 0.08 | | | | | |
| GRP | 0 | 1.3 | 3 | 4.0 | 50000 | 6E−06 | 199098 | 1.18 | | | | | |
| Jacket FRPVC | 6.5 | 8.8 | 1 | 27.6 | 90 | 7E−05 | 2487 | 0.18 | | | | | |
| Plastic To GRP Ratio | | | | 9.9 | | | | | 202645.51 | 1.44 | 7.1E−06 | 83 | 0.06% |
| GRP flexible Bend Diameter (mm) = 100 × GRP Diameter | | 130 | | | | | | | | | | | |
| Typical Bend Cable Diameter is 20 X Cable OD | | 176 | | | | | | | | | | | |

Figure 8:
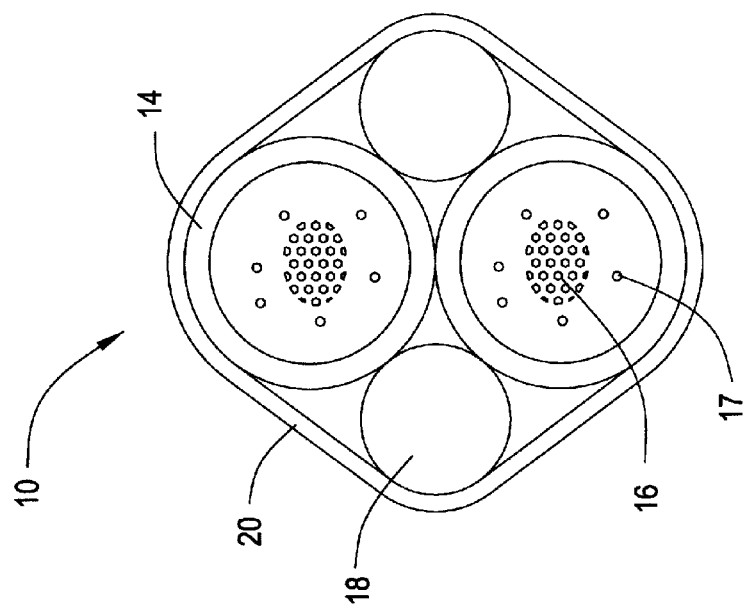
FIG. 8 is a cross section of a loose tube fiber optic cable core according to another embodiment.

Table 6 shows an exemplary set of measurements for a construction according to the present core 10 arrangement shown in FIG. 8 using an FRPVC jacket with FRPVC tubes.

TABLE 6

| 2 tube 2 grp FRPVC jacket | ID (mm) | OD (mm) | Qty | Area | E (N/mm$^2$) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 2 | 7.9 | 90 | 7E−05 | 707 | 0.05 | | | | | |
| GRP | 0 | 1.3 | 2 | 2.7 | 50000 | 6E−06 | 132732 | 0.79 | | | | | |
| Jacket FRPVC | 6.05 | 8.35 | 1 | 26.0 | 90 | 7E−05 | 2340 | 0.17 | | | | | |
| Plastic To GRP Ratio | | | | 12.8 | | | | | 135779.61 | 1.01 | 7.4E−06 | 83 | 0.06% |
| GRP flexible Bend Diameter (mm) = 100 × GRP Diameter | | 130 | | | | | | | | | | | |

TABLE 6-continued

| 2 tube 2 grp FRPVC jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Typical Bend Cable Diameter is 20 X Cable OD | | 167 | | | | | | | | | | | |

Table 7 shows an exemplary set of measurements for a construction according to the present core 10 arrangement shown in FIG. 8 using an FRPVC jacket with FRPVC tubes.

TABLE 7

| 1 tube 2 grp FRPVC jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 1 | 3.9 | 90 | 7E−05 | 353 | 0.03 | | | | | |
| GRP | 0 | 1.3 | 2 | 2.7 | 50000 | 6E−06 | 132732 | 0.79 | | | | | |
| Jacket FRPVC | 4.35 | 6.65 | 1 | 19.9 | 90 | 7E−05 | 1788 | 0.13 | | | | | |
| Plastic To GRP Ratio | | | | 9.0 | | | | | 134873.42 | 0.94 | 7E−06 | 83 | 0.06% |
| GRP flexible Bend Diameter (mm) = 100 × GRP Diameter | | 130 | | | | | | | | | | | |
| Typical Bend Cable Diameter is 20 X Cable OD | | 133 | | | | | | | | | | | |

As seen in the comparison in the following TABLE A, the present core 10 represented by FIGS. 6, 8 and 9 shown in Tables 4-7 are smaller and generally have a lower plastic to GRP ratio than their comparable (same number of fibers) prior art designs.

TABLE A

| | SUMMARY TABLE | Bend Diameter | | SUM | | | Temp | Percent | Plastic/Grp |
|---|---|---|---|---|---|---|---|---|---|
| Table | Description | GRP | Cable | AE | Aea | a eff | Delta | Contraction | Ratio |
| Table 1 | Prior Art 6 @1 PVDF Jkt | 320 | 226 | 4E+05 | 4.45 | 1E−05 | 83 | 0.09% | 7.5 |
| Table 2 | Prior Art 6 @1 FRPVC Jkt | 228 | 226 | 2E+05 | 3.3 | 1E−05 | 83 | 0.12% | 14.8 |
| Table 3 | Prior Art 4 @1 PVDF Jkt | 130 | 191 | 79912 | 2.07 | 3E−05 | 83 | 0.22% | 34.7 |
| Table 4 | 3 tube 3 grp PVDF jacket | 130 | 175 | 2E+05 | 2.69 | 1E−05 | 83 | 0.11% | 9.9 |
| Table 5 | 3 tube 3 grp FRPVC jacket | 130 | 176 | 2E+05 | 1.44 | 7E−06 | 83 | 0.06% | 9.9 |
| Table 6 | 2 tube 2 grp FRPVC jacket | 130 | 167 | 1E+05 | 1.01 | 7E−06 | 83 | 0.06% | 12.8 |
| Table 7 | 1 tube 2 grp FRPVC jacket | 130 | 133 | 1E+05 | 0.94 | 7E−06 | 83 | 0.06% | 9.0 |

In an additional comparison TABLE B, the present core 10 (again represented by FIGS. 6, 8 and 9 shown in Tables 4-7) exhibit better contraction percentages and flexibility than their comparable prior art designs, while having smaller outer diameters

TABLE B

| | Single layer cables compared | Bend | | SUM | | | Temp | Percent | Plastic/Grp | Cable to GRP | Cable Diameter | Platic * | /(% |
|---|---|---|---|---|---|---|---|---|---|---|---|---|---|
| Table | Description | GRP | Cable | AE | Aea | a eff | Delta | Contraction | Ratio | Flex Ratio | mm | flex | cont * 100) |
| Table 1 | Prior Art 6 @1 PVDF Jkt | 320 | 226 | 4E+05 | 4.45 | 1E−05 | 83 | 0.09% | 0 | 7.5 | 0.7 | 11.3 | 5 | 60 |
| Table 2 | Prior Art 6 @1 FRPVC Jkt | 228 | 226 | 2E−05 | 3.3 | 1E−05 | 83 | 0.12% | 0 | 14.8 | 1.0 | 11.3 | 15 | 118 |
| Table 3 | Prior Art 4 @1 PVDF Jkt | 130 | 191 | 79912 | 2.07 | 3E−05 | 83 | 0.22% | 0 | 34.7 | 1.5 | 9.5 | 51 | 237 |
| Table 4 | 3 tube 3 grp PVDF jacket | 130 | 175 | 2E+05 | 2.69 | 1E−05 | 83 | 0.11% | 0 | 9.9 | 1.3 | 8.8 | 13 | 126 |
| Table 5 | 3 tube 3 grp FRPVC jacket | 130 | 176 | 2E+05 | 1.44 | 7E−06 | 83 | 0.06% | 0 | 9.9 | 1.4 | 8.8 | 13 | 227 |
| Table 6 | 2 tube 2 grp FRPVC jacket | 130 | 167 | 1E+05 | 1.01 | 7E−06 | 83 | 0.06% | 0 | 12.8 | 1.3 | 8.3 | 16 | 266 |

TABLE B-continued

| Single layer cables compared | | Bend | | SUM | | | Temp | Percent | Plastic/ Grp | Cable to GRP | Cable Diameter | Platic * | /(% |
|---|---|---|---|---|---|---|---|---|---|---|---|---|---|
| Table | Description | GRP | Cable | AE | Aea | a eff | Delta | Contraction | Ratio | Flex Ratio | mm | flex | cont * 100) |
| Table 7 | 1 tube 2 grp FRPVC jacket | 130 | 133 | 1E+05 | 0.94 | 7E−06 | 83 | 0.06% | 0 | 9.0 | 1.0 | 6.6 | 9 | 158 |

As such, the use of the offset GRPs 18 in the present cores 10 in place of the central GRPs of the prior art exhibit a much improved flexibility due to the reduced bending restraints offered by the larger central GRP. Also, because the placement of the smaller GRPs 18, located in areas that would otherwise be voids in the geometrical placement in the 1, 2 tube or 3 tube construction, the resulting structure affords improved overall compression resistance.

Turning now to the second set of tables, these tables numbered 8-16 show exemplary sizes and test results for cable 100 versus prior art versions of similar cables (with the same number of fibers).

Figure 3:
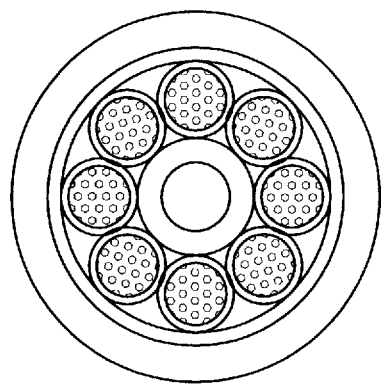

Table 8 shows an exemplary set of measurements for a construction according to prior art FIG. 3 using a PVDF jacket with FRPVC tubes.

TABLE 8

| 96 F Prior Art 8 @1 PVDF Jkt | ID (mm) | OD (mm) | Qty | Area | E (N/ mm^2) | a | AE | AEa | SUM AE | SUM Aea | a eff | Temp 23 to −60 | % contraction |
|---|---|---|---|---|---|---|---|---|---|---|---|---|---|
| GRP | 0 | 3.2 | 1 | 8.0 | 50000 | 6E−06 | 402124 | 2.39 | | | | | |
| Upjacket | 3.2 | 5.5 | 1 | 7.7 | 90 | 7E−05 | 691 | 0.05 | | | | | |
| 7 outer tubes | 2 | 3 | 8 | 31.4 | 90 | 7E−05 | 2827 | 0.2 | | | | | |
| Jacket PVDF | 11.6 | 13.9 | 1 | 46.0 | 400 | 1E−04 | 18420 | 2.39 | | | | | |
| Plastic To GRP Ratio | | | | 10.6 | | | | | 424061.55 | 5.04 | 1.2E−05 | 83 | 0.10% |
| GRP flexible Bend Diameter (mm) = 100 × GRP Diameter | | 320 | | | | | | | | | | | |
| Typical Bend Cable Diameter is 20 X Cable OD | | 278 | | | | | | | | | | | |

Table 9 shows an exemplary set of measurements for a construction according to prior art FIG. 4 using a PVDF jacket with FRPVC tubes.

TABLE 9

| Prior Art 132 F 11 @ upjacketed grp PVDF jacket | ID (mm) | OD (mm) | Qty | Area | E (N/ mm^2) | a | AE | AEa | SUM AE | SUM Aea | a eff | Temp 23 to −60 | % contraction |
|---|---|---|---|---|---|---|---|---|---|---|---|---|---|
| GRP | 0 | 3.2 | 1 | 8.0 | 50000 | 6E−06 | 402124 | 2.39 | | | | | |
| Upjacket | 3.2 | 8.5 | 1 | 40.7 | 90 | 7E−05 | 3659 | 0.26 | | | | | |
| Tube (FRPVC) | 2 | 3 | 11 | 43.2 | 90 | 7E−05 | 3888 | 0.28 | | | | | |
| Jacket PVDF | 14.6 | 16.9 | 1 | 56.9 | 400 | 1E−04 | 22755 | 2.96 | | | | | |
| Plastic To GRP Ratio | | | | 17.5 | | | | | 432426.04 | 5.89 | 1.4E−05 | 83 | 0.11% |
| GRP flexible Bend Diameter (mm) = 100 × GRP Diameter | | 320 | | | | | | | | | | | |
| Typical Bend Cable Diameter is 20 X Cable OD | | 338 | | | | | | | | | | | |

Figure 5:
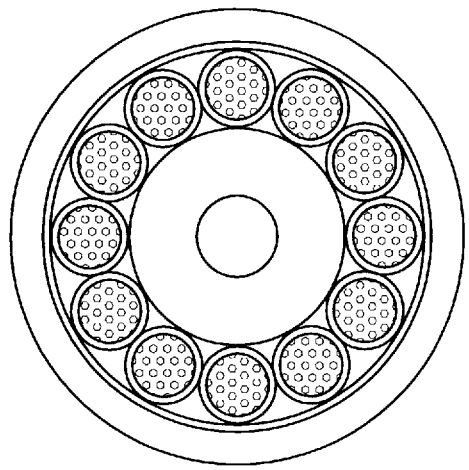

Table 10 shows an exemplary set of measurements for a construction according to prior art FIG. 5 using a PVDF jacket with FRPVC tubes.

TABLE 10

| Prior Art 144 F 12 @ upjacketed grp core PVDF jacket | ID (mm) | OD (mm) | Qty | Area | E (N/ mm^2) | a | AE | AEa | SUM AE | SUM Aea | a eff | Temp 23 to −60 | % contraction |
|---|---|---|---|---|---|---|---|---|---|---|---|---|---|
| GRP | 0 | 3.2 | 1 | 8.0 | 50000 | 6E−06 | 402124 | 2.39 | | | | | |
| Upjacket | 3.2 | 9.5 | 1 | 54.8 | 90 | 7E−05 | 4932 | 0.36 | | | | | |
| Tube (FRPVC) | 2 | 3 | 9 | 35.3 | 90 | 7E−05 | 3181 | 0.23 | | | | | |
| Jacket PVDF | 15.6 | 17.9 | 1 | 60.5 | 400 | 1E−04 | 24200 | 3.15 | | | | | |
| Plastic To GRP Ratio | | | | 18.7 | | | | | 434436.66 | 6.12 | 1.4E−05 | 83 | 0.12% |

TABLE 10-continued

| Prior Art 144 F 12 @ upjacketed grp core PVDF jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| GRP flexible Bend Diameter (mm) = 100 × GRP Diameter | | 320 | | | | | | | | | | | |
| Typical Bend Cable Diameter is 20 X Cable OD | | 358 | | | | | | | | | | | |

Table 11 shows an exemplary set of measurements for a construction according to the present cable 100 arrangement shown in FIG. 14 using an FRPVC jacket with FRPVC tubes.

TABLE 11

| 96 Fiber 1 tube 2 grp core, 7 around core FRPVC jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 1 | 3.9 | 90 | 7E−05 | 353 | 0.03 | | | | | |
| GRP | 0 | 1.3 | 2 | 2.7 | 50000 | 6E−06 | 132732 | 0.79 | | | | | |
| 7 outer tubes | 2 | 3 | 7 | 27.5 | 90 | 7E−05 | 2474 | 0.18 | | | | | |
| Jacket FRPVC | 10.4 | 12.7 | 1 | 41.7 | 90 | 7E−05 | 3754 | 0.27 | | | | | |
| Plastic To GRP Ratio | | | | 27.5 | | | | | 139313.96 | 1.26 | 9.1E−06 | 83 | 0.08% |
| GRP flexible Bend Diameter (mm) = 100 × GRP Diameter | | 130 | | | | | | | | | | | |
| Typical Bend Cable Diameter is 20 X Cable OD | | 254 | | | | | | | | | | | |

Table 12 shows an exemplary set of measurements for a construction according to the present cable 100 arrangement shown in FIG. 14 using a PVDF jacket with FRPVC tubes.

TABLE 12

| 96 Fiber 1 tube 2 grp core, 7 around core PVDF jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 1 | 3.9 | 90 | 7E−05 | 353 | 0.03 | | | | | |
| GRP | 0 | 1.3 | 2 | 2.7 | 50000 | 6E−06 | 132732 | 0.79 | | | | | |
| 7 outer tubes | 2 | 3 | 7 | 27.5 | 90 | 7E−05 | 2474 | 0.18 | | | | | |
| Jacket PVDF | 10.4 | 12.7 | 1 | 41.7 | 400 | 1E−04 | 16686 | 2.17 | | | | | |
| Plastic To GRP Ratio | | | | 27.5 | | | | | 152245.22 | 3.16 | 2.1E−05 | 83 | 0.17% |
| GRP flexible Bend Diameter (mm) = 100 × GRP Diameter | | 130 | | | | | | | | | | | |
| Typical Bend Cable Diameter is 20 X Cable OD | | 254 | | | | | | | | | | | |

Table 13 shows an exemplary set of measurements for a construction according to the present cable 100 arrangement shown in FIG. 13 using an FRPVC jacket with FRPVC tubes.

TABLE 13

| 24 F 2 tube 2 grp FRPVC jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 2 | 7.9 | 90 | 7E−05 | 707 | 0.05 | | | | | |
| GRP | 0 | 1.3 | 2 | 2.7 | 50000 | 6E−06 | 132732 | 0.79 | | | | | |
| Tube (FRPVC) | 2 | 3 | 9 | 35.3 | 90 | 7E−05 | 3181 | 0.23 | | | | | |
| Jacket FRPVC | 12.1 | 14.4 | 1 | 47.9 | 90 | 7E−05 | 4307 | 0.31 | | | | | |
| Plastic To GRP Ratio | | | | 34.3 | | | | | 140927.01 | 1.38 | 9.8E−06 | 83 | 0.08% |
| GRP flexible Bend Diameter (mm) = 100 × GRP Diameter | | 130 | | | | | | | | | | | |
| Typical Bend Cable Diameter is 20 X Cable OD | | 288 | | | | | | | | | | | |

Table 14 shows an exemplary set of measurements for a construction according to the present cable 100 arrangement shown in FIG. 13 using a PVDF jacket with FRPVC tubes.

TABLE 14

| 132 Fiber 9 tubes around 2 tube 2 grp core PVDF jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 2 | 7.9 | 90 | 7E−05 | 707 | 0.05 | | | | | |
| GRP | 0 | 1.3 | 2 | 2.7 | 50000 | 6E−06 | 132732 | 0.79 | | | | | |
| Tube (FRPVC) | 2 | 3 | 9 | 35.3 | 90 | 7E−05 | 3181 | 0.23 | | | | | |
| Jacket PVDF | 12.1 | 14.4 | 1 | 47.9 | 400 | 1E−04 | 19142 | 2.49 | | | | | |
| Plastic To GRP Ratio | | | | 34.3 | | | | | 155762.24 | 3.56 | 2.3E−05 | 83 | 0.19% |
| GRP flexible Bend Diameter (mm) = 100 × GRP Diameter | | 130 | | | | | | | | | | | |
| Typical Bend Cable Diameter is 20 X Cable OD | | 288 | | | | | | | | | | | |

Table 15 shows an exemplary set of measurements for a construction according to the present cable 100 arrangement shown in FIG. 10 using an FRPVC jacket with FRPVC tubes.

TABLE 15

| 36 F 3 tube/3 grp FRPVC jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 3 | 11.8 | 90 | 7E−05 | 1060 | 0.08 | | | | | |
| GRP | 0 | 1.3 | 3 | 4.0 | 50000 | 6E−06 | 199098 | 1.18 | | | | | |
| Tube (FRPVC) | 2 | 3 | 9 | 35.3 | 90 | 7E−05 | 3181 | 0.23 | | | | | |
| Jacket FRPVC | 12.5 | 14.8 | 1 | 49.5 | 90 | 7E−05 | 4453 | 0.32 | | | | | |
| Plastic To GRP Ratio | | | | 24.3 | | | | | 207792.91 | 1.81 | 8.7E−06 | 83 | 0.07% |
| GRP flexible Bend Diameter (mm) = 100 × GRP Diameter | | 130 | | | | | | | | | | | |
| Typical Bend Cable Diameter is 20 X Cable OD | | 297 | | | | | | | | | | | |

Table 16 shows an exemplary set of measurements for a construction according to the present cable 100 arrangement shown in FIG. 10 using a PVDF jacket with FRPVC tubes.

TABLE 16

| 144 Fiber 9 tubes around 3 tube 3 grp core PVDF jacket | ID (mm) | OD (mm) | Qty | Area | E (N/mm^2) | a | AE | AEa | SUM AE | SUM Aea | a eff | Temp 23 to −60 | % contraction |
|---|---|---|---|---|---|---|---|---|---|---|---|---|---|
| Tube (FRPVC) | 2 | 3 | 3 | 11.8 | 90 | 7E−05 | 1060 | 0.08 | | | | | |
| GRP | 0 | 1.3 | 3 | 4.0 | 50000 | 6E−06 | 199098 | 1.18 | | | | | |
| Tube (FRPVC) | 2 | 3 | 9 | 35.3 | 90 | 7E−05 | 3181 | 0.23 | | | | | |
| Jacket PVDF | 12.5 | 14.8 | 1 | 49.5 | 400 | 1E−04 | 19793 | 2.57 | | | | | |
| Plastic To GRP Ratio | | | | 24.3 | | | | | 223132.12 | 4.06 | 1.8E−05 | 83 | 0.15% |
| GRP flexible Bend Diameter (mm) = 100 × GRP Diameter | | 130 | | | | | | | | | | | |
| Typical Bend Cable Diameter is 20 X Cable OD | | 297 | | | | | | | | | | | |

As seen in the comparison in the following TABLE C, the present cable 100 represented by FIGS. 10 and 13-14 shown in Tables 8-10 and 14-16 are smaller and generally have a lower comparable plastic to GRP ratio than prior art designs with the same number of fibers.

TABLE C

| Table | Summary Description | Bend Diam. GRP | Cable | SUM AE | area | eff | Temp Delta | Percent Contraction | Plastic/Gtp Ratio |
|---|---|---|---|---|---|---|---|---|---|
| Table 11 | 96 Fiber 1 tube 2 grp core, 7 around core FRPVC jacket | 130 | 254 | 1E+05 | 1.26 | 9E−06 | 83 | 0.08% | 27.5 |

TABLE C-continued

| Table | Summary Description | Bend Diam. GRP | Cable | SUM AE | area | eff | Temp Delta | Percent Contraction | Plastic/Gtp Ratio |
|---|---|---|---|---|---|---|---|---|---|
| Table 13 | 24 F 2 tube 2 grp FRPVC jacket | 130 | 288 | 1E+05 | 1.38 | 1E−05 | 83 | 0.08% | 34.3 |
| Table 15 | 36 F 3 tube/3 grp FRPVC jacket | 130 | 297 | 2E+05 | 1.81 | 9E−06 | 83 | 0.07% | 24.3 |
| Table 8 | 96 F Prior Art 8 @1 PVDF Jkt | 320 | 278 | 4E+05 | 5.04 | 1E−05 | 83 | 0.10% | 10.6 |
| Table 9 | Prior Art 132 F 11 @ upjacketed grp PVDF jacket | 320 | 338 | 4E+05 | 5.89 | 1E−05 | 83 | 0.11% | 17.5 |
| Table 10 | Prior Art 144 F 12 @ upjacketed grp core PVDF jacket | 320 | 358 | 4E+05 | 6.12 | 1E−05 | 83 | 0.12% | 18.7 |
| Table 12 | 96 Fiber 1 tube 2 grp core, 7 around core PVDF jacket | 130 | 254 | 2E+05 | 3.16 | 2E−05 | 83 | 0.17% | 27.5 |
| Table14 | 132 Fiber 9 tubes around 2 tube 2 grp core PVDF jacket | 130 | 288 | 2E+05 | 3.56 | 2E−05 | 83 | 0.19% | 34.3 |
| Table 16 | 144 Fiber 9 tubes around 3 tube 3 grp core PVDF jacket | 130 | 297 | 2E+05 | 4.06 | 2E−05 | 83 | 0.15% | 24.3 |

In an additional comparison TABLE D, the present cable 20 100 (again represented by FIGS. 10 and 13-14 shown in Tables 8-10 and 14-16) exhibit comparable or improved contraction percentages and flexibility than their comparable prior art designs, while having smaller outer diameters.

TABLE D

| Table | Description | Bend GRP | Diameter Cable | 8 UM AE | Aea | a eff | Temp Delta | Percent Contraction | |
|---|---|---|---|---|---|---|---|---|---|
| | 96 Fiber cables compared | | | | | | | | |
| Table 8 | 96 F Prior Art 8 @1 PVDF Jkt | 320 | 278 | 4E+05 | 5.04 | 1E−05 | 83 | 0.10% | |
| Table 12 | 96 Fiber 1 tube 2 grp core, 7 around core FRPVC jacket | 130 | 254 | 1E+05 | 1.26 | 9E−06 | 83 | 0.08% | |
| Table 13 | 96 Fiber 1 tube 2 grp core, 7 around core PVDF jacket | 130 | 254 | 2E+05 | 3.16 | 2E−05 | 83 | 0.17% | |
| | 132 Fiber cables compared | | | | | | | | |
| Table 9 | Prior Art 132 F 11 @ upjacketed grp PVDF jacket | 320 | 338 | 4E+05 | 5.89 | 1E−05 | 83 | 0.11% | 0 |
| Table 13 | 132 Fiber 9 tubes around 2 tube 2 grp core FRPVC jacket | 130 | 288 | 1E+05 | 1.38 | 1E−05 | 83 | 0.08% | 0 |
| Table 14 | 132 Fiber 9 tubes around 2 tube 2 grp core PVDF jacket | 130 | 288 | 2E+05 | 3.56 | 2E−05 | 83 | 0.19% | 0 |
| | 144 Fiber cables compared | | | | | | | | |
| Table 10 | Prior Art 144 F 12 @ upjacketed grp core PVDF jacket | 320 | 358 | 4E+05 | 6.12 | 1E−05 | 83 | 0.12% | 0 |
| Table 15 | 144 Fiber 9 tubes around 3 tube 3 grp core FRPVC jacket | 130 | 297 | 2E+05 | 1.81 | 9E−06 | 83 | 0.07% | 0 |
| Table 16 | 144 Fiber 9 tubes around 3 tube 3 grp core PVDF jacket | 130 | 297 | 2E+05 | 4.06 | 2E−05 | 83 | 0.15% | 0 |

| Table | Description | Plastic/Grp Ratio | Cable to GRP Flex Ratio | Cable Diameter mm | Platic * flex | /(% cont * 100) |
|---|---|---|---|---|---|---|
| | 96 Fiber cables compared | | | | | |
| Table 8 | 96 F Prior Art 8 @1 PVDF Jkt | 10.6 | 0.9 | 13.9 | 9 | 93 |
| Table 12 | 96 Fiber 1 tube 2 grp core, 7 around core FRPVC jacket | 27.5 | 2.0 | 12.7 | 54 | 715 |
| Table 13 | 96 Fiber 1 tube 2 grp core, 7 around core PVDF jacket | 27.5 | 2.0 | 12.7 | 54 | 312 |
| | 132 Fiber cables compared | | | | | |
| Table 9 | Prior Art 132 F 11 @ upjacketed grp PVDF jacket | 17.5 | 0.9 | 16.9 | 15 | 134 |
| Table 13 | 132 Fiber 9 tubes around 2 tube 2 grp core FRPVC jacket | 34.3 | 2.0 | 14.4 | 67 | 825 |
| Table 14 | 132 Fiber 9 tubes around 2 tube 2 grp core PVDF jacket | 34.3 | 2.0 | 14.4 | 67 | 353 |

TABLE D-continued

| | 144 Fiber cables compared | | | | | |
|---|---|---|---|---|---|---|
| Table 10 | Prior Art 144 F 12 @ upjacketed grp core PVDF jacket | 18.7 | 1.1 | 17.9 | 21 | 179 |
| Table 15 | 144 Fiber 9 tubes around 3 tube 3 grp core FRPVC jacket | 24.3 | 2.3 | 14.8 | 55 | 767 |
| Table 16 | 144 Fiber 9 tubes around 3 tube 3 grp core PVDF jacket | 24.3 | 2.3 | 14.8 | 55 | 367 |

As illustrated in the above comparisons, the advantageous construction of the cable 100 as per FIGS. 10 and 13-14 provides improvements in the anti-buckling cold temperature contraction measurements. For example, this construction for cable 100 is able to keep the percent contraction at the normally tested temperature ranges at approximately 0.20% or less.

In the above arrangements using the filled FRPVC (having a low modulus) these tubes and jackets create less contraction forces at cold temperatures, thus the Plastic Area to GRP Area ratio can be increased to between 25 to 35 as compared to the typical prior art for a 96, 132 and 144 fiber designs having a ratio, while still maintaining good shrinkage percentage results.

The GRP flex measurements above equates to 100× the GRP diameter, measured in millimeters. The Cable Flex measurements equates to 20× the cable diameter. The ratio of cable flex/GRP flex in the prior art 96, 132 and 144 fiber arrangements ranged from 0.9 to 1.1, whereas the novel assembly provides a more flexible range from 2.0 to 2.3. In other words, such cable 100 can bend more than twice as much (around a mandrel with ½ the diameter) compared to the prior art.

Further regarding Tables C and D, an amplified comparison is done by multiplying the plastic/GRP area ratio by the cable flex/GRP flex ratio. The prior art ninety six (96), one hundred and thirty two (132) and one hundred and forty four (144) fiber cables render a plastic X flex ratio range of 9-21, whereas the present ninety six (96), one hundred and thirty two (132) and one hundred and forty four (144) fiber cables 100 shown in FIGS. 10 and 13-14 have a plastic X flex ratio range of 54-67. Further this number can be divided by the (percent contraction×100) to render a different version of the comparison showing the prior art ninety six (96), one hundred and thirty two (132) and one hundred and forty four (144) fibers designs with an effective flex measurement in the range of 90-179 whereas the present cable 100 exhibits a flex measurement in the range of having a range of 312 to 925.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A multi-tube optical fiber cable, said cable comprising:
a core having:
a first set of one or more optical fiber tubes, each having one or more optical fibers loosely arranged therein, wherein said first set of tubes are constructed of a polymer having a desired Young's constant modulus;
at least two strength members; and
a first binder arranged around said first set of optical fiber tubes and said strength members, wherein said first binder is substantially flat in shape such that there is no deformation of said first set of tubes, and wherein said at least two strength members are offset from a central axis of said cable,
said cable further comprising:
a second set of a plurality of optical fiber tubes, each having one or more optical fibers loosely arranged therein, arranged around the outer circumference of said core, and
a second binder arranged around said second set of tubes, wherein said second binder is substantially flat in shape such that there is no deformation in the second set of tubes.

2. The cable as claimed in claim 1, wherein said second set of a plurality of optical fiber tubes are stranded around said core in either one of a helical or an SZ arrangement.

3. The cable as claimed in claim 2, wherein said second set of a plurality of optical fiber tubes are arranged over said core such that their contraction and expansion due to thermal environmental conditions are restricted by said core.

4. The cable as claimed in claim 1, wherein said second set of a plurality of optical fiber tubes are stranded around said core in a helical arrangement.

5. The cable as claimed in claim 4, wherein said second set of a plurality of optical fiber tubes are arranged over said core such that their contraction and expansion due to thermal environmental conditions are restricted by said core.

6. The cable as claimed in claim 1, further comprising a flame retardant filler interposed in interstices between said first set of one or more optical fiber tubes and said at least two strength members in said core.

7. The cable as claimed in claim 6, wherein said flame retardant filler is Alumina Trihydrate.

8. The cable as claimed in claim 1, wherein said first set of one or more optical fiber tubes of said core and said second set of one or more optical fiber tubes are constructed of a polymer having a Tensile Strength substantially in the range of 2500-2800 PSI or a broader range of tensile strength range from about 2000-3000 psi, and a Young's tensile or compression) modulus of 40-90 N/mm2 (5800 psi to 13050 psi).

9. The cable as claimed in claim 1, further comprising a jacket over said second set of one or more optical fiber tubes.

10. The cable as claimed in claim 9, wherein said jacket, said first set of one or more optical fiber tubes of said core and said second set of one or more optical fiber tubes are all constructed of FRPVC (Fire Resistant Poly-Vinyl Chloride).

11. The cable as claimed in claim 9, wherein said jacket is constructed of PVDF (Polyvinylidene Fluoride) and where said first set of one or more optical fiber tubes of said core and said second set of one or more optical fiber tubes are constructed of FRPVC (Fire Resistant Poly-Vinyl Chloride).

12. The cable as claimed in claim 1, wherein a cross sectional area of said at least two strength members is increased relative to the cross sectional area of said first and second set of tubes such that the contraction and expansion of said first and second sets of tubes due to thermal environmental conditions are restricted by said core.

13. The cable as claimed in claim 1, wherein said cable has an outside diameter and flexibility rating that allows it to bend around a mandrel that is ½ of 20 times said outside diameter.

14. The cable as claimed in claim 1, wherein cross sectional area of all of the polymer in said cable, to the cross sectional area of said strength members is substantially between 25 to 35.

* * * * *